United States Patent
Kido et al.

(10) Patent No.: US 6,299,659 B1
(45) Date of Patent: Oct. 9, 2001

(54) POLISHING MATERIAL COMPOSITION AND POLISHING METHOD FOR POLISHING LSI DEVICES

(75) Inventors: Takanori Kido; Fumio Tsujino; Kagetaka Ichikawa, all of Shiojiri; Nobuo Uotani, Chiba, all of (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 09/564,205

(22) Filed: May 4, 2000

Related U.S. Application Data

(63) Continuation of application No. PCT/JP99/04241, filed on Aug. 5, 1999.
(60) Provisional application No. 60/132,446, filed on May 4, 1999.

(30) Foreign Application Priority Data

Aug. 5, 1998 (JP) .................................. 10-221997
Dec. 28, 1998 (JP) .................................. 10-373777

(51) Int. Cl.$^7$ .............................. C09K 3/14; C09G 1/04; B24B 1/00
(52) U.S. Cl. .................................. 51/309; 51/307; 106/3; 438/692; 438/693; 451/41
(58) Field of Search ........................ 51/307, 309; 106/3; 438/692, 693; 451/41

(56) References Cited

U.S. PATENT DOCUMENTS

| | | | |
|---|---|---|---|
| 4,551,481 | * | 11/1985 | Smith et al. ............................ 521/52 |
| 4,565,644 | * | 1/1986 | Smith et al. ............................ 252/92 |
| 4,594,362 | * | 6/1986 | Smith et al. ............................ 521/52 |
| 4,664,679 | * | 5/1987 | Kohyama et al. ...................... 51/309 |

FOREIGN PATENT DOCUMENTS

| | | | |
|---|---|---|---|
| 60-127965 | 7/1985 | (JP) | ................. B24B/37/00 |
| 8-134435 | 5/1996 | (JP) | ................. C09K/3/14 |
| 10-152673 | 6/1998 | (JP) | ................. C09K/3/14 |

OTHER PUBLICATIONS

International Search Report (no date).

* cited by examiner

*Primary Examiner*—Michael Marcheschi
(74) *Attorney, Agent, or Firm*—Sughrue, Mion, Zinn, Macpeak & Seas, PLLC

(57) ABSTRACT

A polishing-material composition, for polishing of LSI devices, which is a polishing-material composition comprising water and cerium oxide which has been surface-treated with a coupling agent, wherein the maximum value is no greater than about 5 μm and the average value is about 0.01–1.0 μm in the secondary particle size distribution of the cerium oxide. Also, a polishing method for LSI devices which employs the polishing-material composition.

18 Claims, No Drawings

POLISHING MATERIAL COMPOSITION AND POLISHING METHOD FOR POLISHING LSI DEVICES

This application claims benefit of earlier application based on U.S. patent application Ser. No. 60/132,446, filed May 4, 1999. This application is a continuation of PCT/JP99/04241, filed Aug. 5, 1999, which claims priorities on Japanese Application 221997/98 filed Aug. 5, 1998 and Japanese Application 373777/98 filed Dec. 28, 1998.

TECHNICAL FIELD

The present invention relates to a polishing-material composition that allows highly accurate surfaces to be obtained at high efficiency by polishing. More specifically, the invention relates to a polishing-material composition suitable for polishing steps on insulating films such as silicon dioxide films, silicon nitride films and organic films used in manufacturing processes for LSI devices.

BACKGROUND ART

With the recent remarkable progress in computer-related technology there have been, year by year, advancements in the integration of LSI devices, while the memory capacities of magnetic disks are constantly on the increase; one of the fundamental techniques on which this progress has been based is polishing processing.

In manufacturing processes for LSI devices, polishing techniques for interlayer insulating films have been introduced and are beginning to be employed in practice for the major object of alleviating the problem on depth of focus in the photolithography step that occurs with refinement of design rules. There are also being seen more and more applications of polishing processing techniques such as embedded metal polishing (the Damascene method) for formation of fine wiring and the Shallow Trench Isolation method aimed at achieving separation of elements on narrower surface areas than by the conventional LOCOS (Local Oxidation of Silicon) method, as indispensable elemental technologies for the manufacture of next generation LSI devices. In this field, which involves polishing to miniature elements and wiring structures, high accuracy of finished surfaces is of course a requirement, but high efficiency and stability of the polishing process is also desired.

Polishing interlayer insulating film and Shallow Trench Isolation have been primarily studied using a slurry suspended silicon dioxide fine powder obtained by a gas phase method in an alkaline aqueous solution or a slurry suspended cerium oxide powder in water, whereas metal polishing has been primarily studied using a slurry suspended silicon dioxide powder, also obtained by a gas phase method, or aluminum oxide powder in water, with addition of an oxidizing agent such as iron nitrate or hydrogen peroxide. However, it has not yet been possible to achieve a level which satisfies all of the standpoints of surface-accuracy (or finishing level), polishing rate and stability of polishing rate. In order to achieve a high surface-accuracy it is necessary for the polishing-material particles to have a fineness on the order of submicrons, but smaller polishing-material particles generally result in a slower polishing rate. Thus, there has been a trade-off between surface-accuracy and polishing rate, and it has not generally been easy to achieve both.

Alkaline slurries suspended silicon dioxide fine powders have been used to achieve high surface-accuracy in polishing interlayer insulating film, which has been the most practiced method of polishing for LSI device manufacturing processes, but the low polishing rate has been an inconvenience. The polishing rate generally increases gradually from the start of polishing, tending to stabilize after the course of a given time of usually a few minutes or more; however, since the machining thickness is at most about 1 $\mu$m for polishing in LSI device manufacturing processes, the polishing time most often is on the order of a few minutes. In other words, since the polishing is completed within a start-up region wherein polishing rate is still unstable, a considerable burden has existed in detecting the end point.

In contrast, cerium oxide slurries are advantageous for achieving both surface-accuracy and polishing rate in polishing interlayer insulating film and Shallow Trench Isolation method, but the polishing rate tends to increase with longer polishing time as in the case of silica slurries, and since the higher polishing rate makes it more difficult to detect the end point, this has constituted an obstacle against their practical implementation.

In the Shallow Trench Isolation method, a silicon nitride film is situated under the silicon dioxide film to be polished so that polishing is carried out with the silicon nitride film as a stopper, and therefore it has been necessary to have a fast polishing rate for the silicon dioxide film and a slow polishing rate for the silicon nitride film, or in other words, to have a high "selectivity ratio" which is the value of the polishing rate for the silicon dioxide film divided by that for the silicon nitride film; however, a problem has existed in that both silicon dioxide slurries and cerium oxide slurries have "selectivity ratios" of as low as about 2–6.

As explained above under "Background Art", it has been strongly desired to realize higher levels of both surface-accuracy and polishing rate, as well as stability of polishing rate, than is currently achieved in polishing steps on insulating films such as silicon dioxide films, silicon nitride films and organic films in manufacturing processes for LSI devices.

The present invention provides a polishing-material composition that can overcome the problems referred to above.

DISCLOSURE OF THE INVENTION

As a result of diligent research aimed at solving the aforementioned problems, the present inventors have discovered a polishing-material composition for polishing LSI devices characterized by a polishing-material composition containing water and cerium oxide which has been surface treated with a coupling agent, the maximum value being no greater than about 5 $\mu$m and the average value being about 0.01 to about 1.0 $\mu$m in the secondary particle size distribution of the cerium oxide; the polishing-material composition for polishing LSI devices characterized in that the primary crystal size of the cerium oxide is about 0.005 to about 0.5 $\mu$m; the polishing-material composition for polishing LSI devices characterized in that the cerium oxide concentration in the polishing-material composition is about 0.01–about 10 wt %; and the polishing-material composition for polishing LSI devices characterized in that the coupling agent is at least one coupling agent selected from among silane coupling agents, titanate coupling agents, zirconate coupling agents, aluminum coupling agents and phosphate coupling agents.

In polishing steps for LSI device insulating films, polishing-material compositions using silicon dioxide as the abrasive grains and polishing-material compositions using manganese dioxide as the abrasive grains have been studied in addition to cerium oxide but, for the present invention, the abrasive grains have been limited to cerium oxide. According to the invention, minimal improvement in polishing performance is achieved when silicon dioxide or manganese dioxide is used as the abrasive grains, and it is not possible to reach a satisfactory level desired for polishing LSI device insulating films.

According to the invention it is possible to realize a high level of both surface-accuracy (or surface finishing level) and polishing rate, as well as stabilization of polishing rate, by creating a condition where the polishing-material particles are strongly held in a polishing-pad during polishing. The polishing-pad is entirely made of resin, and the main polishing-pads used in polishing steps for LSI devices that require high accuracy are dry independent pore-type polyurethane pads produced by casting or slicing (such as "IC1000" by Rodel, Inc.), or nonwoven types prepared by impregnating polyurethane into polyester fibers and dry-foaming (such as "Suba400" by Rodel, Inc.), or two-layer types that are laminates of these two types of pads (such as "IC1000/Suba400" by Rodel, Inc.). Fluorine resin-based pads are also being investigated. Thus, while the pad material is an organic compound, the abrasive grain material used for the invention, i.e. cerium oxide, is an inorganic compound. Surfaces of inorganic compounds such as metal oxides usually have low affinity for and are poorly compatible with the surfaces of organic compounds. It was therefore considered that if it were possible to increase the affinity between cerium oxide and the pad, a condition would be created where the cerium oxide would be strongly held in the polishing-pad, thus resulting in a greater percentage of the cerium oxide effectively acting on the working target and allowing improvement the polishing rate.

A generally effective means to increase the affinity between inorganic compound surfaces and organic compound surfaces which is publicly known is surface treatment with a coupling agent, but it is almost never applied to polishing-material compositions. Since surface treatment with coupling agents is a technique originally applied in fields requiring filling of organic materials with inorganic filler particles, its use is not readily imaginable and has not been considered for the widely employed polishing-material compositions composed mainly of water, that are the object of the present invention.

An example of a technique of applying surface treatment with a coupling agent in some form to a polishing-material composition is described below, but it offers no teaching in regard to the concept of attempting to improve polishing rate by strengthening the affinity between the abrasive grains and the pad, for polishing-material compositions composed mainly of water which is the object of the present invention.

In Japanese Unexamined Patent Publication (Kokai) No. 60-127965 there is disclosed a composition prepared by reacting an inorganic compound powder with a coupling agent and dispersing it in an organic solvent. However, in limited applications where the dispersing medium is an organic solvent, it is very natural to treat the surface of the inorganic compound powder with a coupling agent, and this is therefore totally unrelated to the present invention where the dispersing medium is water.

It is overwhelmingly common to use water as the dispersing medium for polishing-material compositions. This is because water has a greater accelerating effect on polishing than organic solvents. When polishing glass, for example, the presence of water forms a hydrate layer on the glass surface which allows accelerated polishing, so that a high surface-accuracy can be obtained at a high polishing rate, whereas actual polishing-material compositions where the dispersing medium is an organic solvent have virtually no polishing power on glass. Even when polishing metals, high resolution surfaces at high polishing rates can be obtained when the metal surface undergoes hydrolysis in the presence of water, forming metal oxide layers or hydroxide layers. When an organic solvent instead of water is used as the dispersing medium, since the polishing rate is notably lower, this is not pertinent to the present invention, the object of which is to realize a high level of surface-accuracy and polishing rate. According to the preferred mode of the invention, organic solvents are substantially absent.

According to the invention there is also provided a polishing method for LSI devices, which comprises a step of polishing an LSI device using a polishing pad made of resin and a polishing-material composition containing water and cerium oxide which has been surface-treated with a coupling agent, wherein the maximum value is no greater than about 5 μm and the average value is about 0.01 to about 1.0 μm in the secondary particle size distribution of the cerium oxide. In this method, the LSI device has a silicon nitride film formed by CVD on a silicon substrate and a silicon dioxide film formed thereon by CVD, and the method comprises a step of polishing the silicon dioxide film using the polishing-material composition, the pH of the composition being about 4 to about 11, and using the silicon nitride as a stopper, wherein the ratio of the polishing rate for the silicon dioxide film to that for the silicon nitride film may be about 10 or greater, and even about 50 or greater.

BEST MODE FOR CARRYING OUT THE INVENTION

The cerium oxide used for the invention will be explained first.

The degree of purity of the cerium oxide is preferably high purity, which may be 99 wt % or greater, and even more preferably 99.9 wt % or greater. If the purity is low, even washing of the LSI device after polishing will not be able to easily rid the surface of the LSI device of impurity elements that adversely affect the properties of the LSI device, and this will create the undesirable situation of increased product defects and poorer yields.

In the secondary particle size distribution of the cerium oxide, the maximum value is preferably no greater than about 5 μm, more preferably no greater than about 3 μm, and even more preferably no greater than about 1 μm. It is not desirable for the maximum value to exceed about 5 μm because this will tend to result in minute imperfections in the polished surface. Also, the average value in the secondary particle size distribution of the cerium oxide is preferably about 0.01 to about 1.0 μm, and more preferably about 0.1 to about 0.5 μm. This is because at less than about 0.01 μm the polishing rate on insulating films such as silicon dioxide films, silicon nitride films and organic films will be reduced. On the other hand, it is preferably not over about 1.0 μm because this will tend to result in minute imperfections in the polishing surface.

The primary crystal size of the cerium oxide is preferably about 0.005 to about 0.5 μm, and more preferably about 0.02 to about 0.2 μm. At less than about 0.005 μm the polishing rate on insulating films such as silicon dioxide films, silicon nitride films and organic films will be notably reduced, while it is preferably not over 0.5 μm because this will tend to result in minute imperfections in the polishing surface.

The coupling agent used for the invention may be a silane coupling agent, titanate coupling agent, zirconate coupling agent, aluminum coupling agent, phosphate coupling agent, etc. As examples of silane coupling agents there may be mentioned vinyltrichlorosilane, 1,2-dichloroethyltrichlorosilane, 1-chloroethyltrichlorosilane, 2-chloroethyltrichlorosilane, ethyltrichlorosilane, 3,3,3-trifluoropropyltrichlorosilane, 2-cyanoethyltrichlorosilane, allyltrichlorosilane, 3-bromopropyltrichlorosilane, 3-chloropropyltrichlorosilane, n-propyltrichlorosilane, 3-cyanopropyltrichlorosilane, n-butyltrichlorosilane, isobutyltrichlorosilane, pentyltrichlorosilane, hexyltrichlorosilane, benzyltrichlorosilane, p-tolyltrichlorosilane, 6-trichlorosilyl-2-norbornane, 2 -trichlorosilylnorbornane, heptyltrichlorosilane, 2-(4-cyclohexenylethyl)trichlorosilane, octyltrichlorosilane, chlorophenylethyltrichlorosilane, tetradecyltrichlorosilane, octadecyltrichlorosilane, eicosyltrichlorosilane, docosyltrichlorosilane, chloromethyltrimethoxysilane, methyltrimethoxysilane, mercaptomethyltrimethoxysilane, vinyltrimethoxysilane, ethyltrimethoxysilane, 3,3,3-trifluoropropyltrimethoxysilane, 2-cyanoethyltrimethoxysilane, 3-chloropropyltrimethoxysilane, 3-mercaptopropyltrimethoxysilane, 3-aminopropyltrimethoxysilane, 2-aminoethylaminomethyltrimethoxysilane, butyltrimethoxysilane, 3-trifluoroacetoxypropyltrimethoxysilane, 3-(aminoethylaminopropyl)trimethoxysilane, phenyltrimethoxysilane, 3-glycidoxypropyltrimethoxysilane, 3-allylaminopropyltrimethoxysilane, hexyltrimethoxysilane, 3-morpholinopropyltrimethoxysilane, 3-piperazinopropyltrimethoxysilane, 3-[2-(2-aminoethylaminoethylamino)propyl]trimethoxysilane, 2-(3, 4-epoxycyclohexyl)ethyltrimethoxysilane, 3-piperidinopropyltrimethoxysilane, 3-phenylaminopropyltrimethoxysilane, 3-cyclohexylaminopropyltrimethoxysilane, O,O'-diethyl-S-(2-triethoxysilylethyl)dithiophosphate, 3-benzylaminopropyltrimethoxysilane, 3-methacryloxypropyltrimethoxysilane, methyltriethoxysilane, vinyltriethoxysilane, ethyltriethoxysilane, 3-chloropropyltriethoxysilane, propyltriethoxysilane, 3-aminopropyltriethoxysilane, 2-(2-aminoethylthioethyl)triethoxysilane, pentyltriethoxysilane, 4-chlorophenyltriethoxysilane, phenyltriethoxysilane, benzyltriethoxysilane, 6-triethoxysilyl-2-norbornane, octyltriethoxysilane, 3-(triethoxysilylpropyl)-p-nitrobenzamide, dodecyltriethoxysilane, octadecyltriethoxysilane, allyltriethoxysilane, 3-glycidoxypropyltriethoxysilane, 3-methacryloxypropyltriethoxysilane, 3-(aminoethylaminopropyl)triethoxysilane, methyltripropoxysilane, vinyltris(2-methoxyethoxy)silane, 3-glycidoxypropylmethyldiethoxysilane, 3-methacryloxypropylmethyldimethoxysilane, 3-methacryloxypropylmethyldiethoxysilane and 3-(aminoethylaminopropyl)methyldimethoxysilane etc. In addition, while silicones having hydrolytic groups, among structures of silazanes and their condensates or other derivatives, chlorosilanes and their condensates or other derivatives, alkoxysilanes and their condensates or other derivatives, etc. are generally not classified as silane coupling agents, they may also be used according to the invention. As examples of titanate coupling agents there may be mentioned neopentyl(diallyl)oxytri(dioctyl) pyrophosphate titanate, etc. As examples of zirconate coupling agents there may be mentioned cyclo(dioctyl) pyrophosphate dioctylzirconate, etc. As examples of aluminum coupling agents there may be mentioned acetoalkoxyaluminum diisopropylate, etc. As examples of phosphate coupling agents there may be mentioned dibutyl-2-metallyloyloxy diethylphosphate, etc. Among these, silane coupling agents are most often used industrially for their advantages in terms of cost, abundance of different types and ready availability. Alkoxy-based silanes are preferred among these silane coupling agents, and as examples there may be mentioned vinyltrimethoxysilane, vinyltriethoxysilane, 2-(3,4-epoxycyclohexyl)ethyltrimethoxysilane, 3-glycidoxypropyltrimethoxysilane, 3-glycidoxypropyltriethoxysilane, 3-glycidoxypropylmethyldiethoxysilane, 3-methacryloxypropyltrimethoxysilane, 3-methacryloxypropyltriethoxysilane, 3-methacryloxypropylmethyldimethoxysilane, 3-methacryloxypropylmethyldiethoxysilane, 3-aminopropyltrimethoxysilane, 2-aminoethylaminomethyltrimethoxysilane, 3-(aminoethylaminopropyl)trimethoxysilane, 3-[2-(2-aminoethylaminoethylamino)propyl]trimethoxysilane, 3-phenylaminopropyltrimethoxysilane, 3-cyclohexylaminopropyltrimethoxysilane, 3-benzylaminopropyltrimethoxysilane, 3-aminopropyltriethoxysilane, 2-(2-aminoethylthioethyl) triethoxysilane, 3-(aminoethylaminopropyl)triethoxysilane, 3-(aminoethylaminopropyl)methyldimethoxysilane, 3-chloropropyltrimethoxysilane, 3-chloropropyltriethoxysilane, mercaptomethyltrimethoxysilane and 3-mercaptopropyltrimethoxysilane. Silane coupling agents with amino groups, such as 3-(aminoethylaminopropyl)methyldimethoxysilane, 3-(aminoethylaminopropyl)trimethoxysilane, 3-(aminoethylaminopropyl)triethoxysilane, 3-aminopropyltrimethoxysilane, 3-aminopropyltriethoxysilane, etc., have high stability in aqueous solutions and are therefore most advantageous for use in the polishing material composition of the invention wherein water is the dispersing medium.

The appropriate amount of these coupling agents to be used will depend on the type of coupling agent, the method of surface treatment and the properties of the cerium oxide target of the surface treatment, but it is preferably about 0.001 to about 5 wt %, and more preferably about 0.01 to about 1 wt %, with respect to the cerium oxide. At less than about 0.001 wt % it will be difficult to achieve improvement in compatibility between the cerium oxide and the pad. At greater than about 5 wt %, however, the water repellency of the cerium oxide may make suspension in water impossible, and since the coupling agent will have a stronger effect at blocking direct contact between the working target and the cerium oxide, this may result in a lower polishing rate.

According to the invention, the surface treatment method using the coupling agent is not particularly restricted. A common industrially established method may be used, such as a dry method which involves atomizing a solution of the coupling agent with dry air or nitrogen while vigorously agitating the cerium oxide with a V-shaped blender to accomplish adequate mixing, and then carrying out heat treatment at about 100 to about 200° C. for condensation reaction on the cerium oxide surface, or a wet method which involves dispersing the cerium oxide in water, etc. to form a slurry and adding a solution of the coupling agent, achieving solid/liquid separation and then drying at about 100–200° C. According to the invention it is also possible to eliminate the heat treatment at about 100 to about 200° C. which is usually carried out for surface treatment by common coupling agents. That is, the surface treatment with the coupling agent will have an effect even if a prescribed amount of the coupling agent is simply mixed with a slurry of the cerium oxide suspended in water.

As mentioned above, the polishing-material composition of the invention is obtained by dispersing cerium oxide subjected to prior surface treatment with a coupling agent in water, which is preferably purified water. Since a particular effect is exhibited by abrasive grain surface treatment with the coupling agent even if a prescribed amount of the coupling agent is mixed with a polishing-material composition comprising a slurry of cerium oxide suspended in water, this may also be used as the polishing-material composition of the invention. The method of dispersing the inorganic compound is not particularly restricted, and a publicly known dispersing machine such as a common stirrer, homomixer, turbine mixer, media agitation mill or the like may be used. During the dispersion, a publicly known dispersing agent may also be added which is considered appropriate for aqueous slurries, such as a polycarboxylate, naphthalenesulfonate formalin condensate, etc. Coarse aggregated particles may be removed by precipitation sorting or filtration.

The polishing-material composition of the invention may also contain various additives that are publicly known in the field, such as viscosity adjusters, pH regulators, buffering agents, chelating agents, surfactants, organic acids and their salts, etc.

According to the invention, the concentration of the cerium oxide that is surface treated with the coupling agent will depend on the polishing conditions including the working pressure during polishing, the type and amount of coupling agent used, and the method of surface treatment, but it is preferably about 0.01 to about 10 wt %, more preferably about 0.1 to about 5 wt % and even more preferably about 0.3 to about 3 wt %. At less than about 0.01 wt %, the polishing rate will be lower for insulating films including silicon dioxide films, silicon nitride films and organic films, while at greater than about 10 wt % there will be little improvement by the increased amount, i.e. little improvement in the polishing rate for insulating films including silicon dioxide films, silicon nitride films and organic films, and it is therefore not economically desirable.

The suitable pH for polishing with the polishing-material composition of the invention will now be explained.

For polishing a silicon dioxide film, the pH is preferably about 2 to about 11 and more preferably about 4–about 10, although it will depend on the type and amount of the coupling agent used and the method of surface treatment. If the pH is less than about 2 the polishing rate for silicon dioxide will be lower, and if the pH is greater than about 11 the polishing rate for silicon dioxide will likewise be lower.

On the other hand, for polishing a silicon nitride film, the polishing rate will usually be reduced when the pH is in the neutral range or near-neutral range, although it will depend on the type and amount of the coupling agent used and the method of surface treatment.

The polishing-material composition of the invention can also be suitably used in the shallow trench isolation method which requires a high "selectivity ratio" which is the value of the polishing rate for the silicon dioxide film divided by that for the silicon nitride film. Since the pH dependency differs for the polishing rate for the silicon dioxide film and the polishing rate for the silicon nitride film, a pH range exists where the "selectivity ratio" is increased. In order to attain a high selectivity ratio, the pH is preferably about 4–about 11 and more preferably about 5–about 10, although it will depend on the type and amount of the coupling agent used and the method of surface treatment.

When an even higher selectivity ratio is necessary in the Shallow Trench Isolation method or the like, it is effective to add to the polishing-material composition of the invention one or more organic acids and their salts, and especially water-soluble organic compounds having at least one from —COOH groups, —COOM$_x$ groups (where M$_x$ is an atom or functional group that can be substituted to an H atom to form a salt), —SO$_3$H groups and —SO$_3$M$_Y$ groups (where M$_Y$ is an atom or functional group that can substitute for an H atom to form a salt).

Of these water-soluble organic compounds, lactic acid, malic acid, tartaric acid, succinic acid, gluconic acid, aspartic acid, glutamic acid, 6-aminohexanoic acid, 2,7-naphthalenedisulfonic acid and 2-aminoethanesulfonic acid are preferred for use, because they allow a high selection ratio to be obtained without in any way impairing the improvement in affinity between the abrasive grains and the pad, which is the most important effect of the invention.

The amount of the water-soluble organic compound to be added is preferably in the range of 0.001–10 parts by weight, and more preferably about 0.005 to about 5 parts by weight, to 1 part by weight of the cerium oxide. At less than about 0.001 part by weight it is difficult to obtain an effect of an improved selection ratio by addition of the water-soluble organic compound, and at greater than 10 parts by weight a minimal increase in effect results from the increased amount, which is not economical.

An even higher selectivity ratio can be obtained by appropriate adjustment of the pH after addition of the water-soluble organic compound. When it is desired to lower the pH, an inorganic acid such as nitric acid, hydrochloric acid or sulfuric acid, an organic acid such as malic acid, lactic acid, tartaric acid, gluconic acid, citric acid monohydrate, succinic acid, adipic acid or fumaric acid, or an acidic amino acid such as aspartic acid or glutamic acid may be used. If instead it is desired to increase the pH, ammonia or an amine such as ethanolamine, or a neutral or basic amino acid such as glycine, 4-aminobutyric acid, 6-aminohexanoic acid, 12-aminolauric acid, alginic acid or glycylglycine may be used.

EXAMPLES

The present invention will now be explained in greater detail by way of examples which, however, are in no way intended to restrict the scope of the invention.

Example 1

With 1000 g of high-purity cerium oxide slurry (GPL-C1010 by Showa Denko, KK., 10 wt % concentration of cerium oxide with $d_{50}$=0.5 μm, primary particle size=0.1 μm, purity=99.9 wt %) there was mixed 0.5 g of a silane coupling agent (A-1120 by Nihon Unica, KK., 3-(aminoethylaminopropyl)trimethoxysilane), and after stirring for 20 hours with a common stirrer, the solid portion was filtered out and dried at 150° C. for 2 hours to obtain 100 g of cerium oxide fine powder surface-treated with a silane coupling agent. Here, the amount of the silane coupling agent was 0.5 wt % with respect to the cerium oxide fine powder.

A 100 g of the cerium oxide fine powder obtained in this manner was dispersed in purified water using a common stirrer, to produce a cerium oxide slurry in a total amount of 10,000 g. The cerium oxide concentration was 1 wt %, and the pH was 5.1.

The following method was used to evaluate the polishing performance of the cerium oxide slurry on a silicon dioxide film and a silicon nitride film.

[Polishing Conditions]

Polishing Target (1) Silicon dioxide film (approximately 1 μm film thickness) formed on a 6" φ, 625-μm thick silicon wafer by CVD.

(2) Silicon nitride film (approximately 0.5 μm film thickness) formed on a 6" φ, 625-μm thick silicon wafer by CVD.

Pad

Two-layer type LSI device polishing pad (IC1000/Suba400 by Rodel, Inc.)

Polishing Machine

Single-side polishing machine for LSI device polishing (Model SH-24 by SpeedFam Co., Ltd., table diameter: 610 mm)

Table Rotation Speed 70 rpm

Working Pressure 300 gf/cm$^2$

Slurry-supply Rate 100 ml/min

Polishing Time 10 sec, 60 sec

[Evaluated Parameters and Evaluation Method]

Polishing Rate

Light interference film thickness measuring apparatus (calculated by dividing the amount of removal by the polishing time)

Imperfections

Dark-field observation with optical microscope (determined by observing 3% of the wafer surface at 200 times and counting the number of detected imperfections per wafer)

As a result of the above polishing test, the polishing rate for silicon dioxide was found to be a very high value of 8700 Å/min for a polishing time of 10 seconds and 8350 Å/min for a polishing time of 60 seconds, and therefore the polishing rate for 10 seconds was 104% of that for 60 seconds. The polishing rate for silicon nitride was also a very high value of 1400 Å/min for a polishing time of 10 seconds and 1350 Å/min for a polishing time of 60 seconds, and therefore the polishing rate for 10 seconds was 104% of that for 60 seconds. It was therefore shown that the polishing rate for both silicon dioxide films and silicon nitride films was stable at a high level at the very initial stage of polishing. Also, absolutely no imperfections were found in the polished surfaces.

Example 2

Ammonia water was added to the cerium oxide slurry obtained in Example 1 to adjust it to pH 8.8, and the polishing performance was evaluated in the same manner as Example 1.

The polishing rate for silicon dioxide was found to be a very high value of 7400 Å/min for a polishing time of 10 seconds and 7200 Å/min for a polishing time of 60 seconds, and therefore the polishing rate for 10 seconds was 103% of that for 60 seconds. However, the polishing rate for silicon nitride was a low value of 135 Å/min for a polishing time of 10 seconds and 130 Å/min for a polishing time of 60 seconds, and the polishing rate for 10 seconds was 104% of that for 60 seconds. In this case, the polishing rate for silicon dioxide films was stable at a high level, while that for the silicon nitride films was stable at a low level. The "selectivity ratio" for 60 seconds was therefore a high value of 55, which is suitable for use in the Shallow Trench Isolation method.

Comparative Example 1

Fumed silica slurry (SC-1, 30 wt %) by Cabot Co. was diluted with purified water to produce a 10 wt % slurry at pH 10.3, and the polishing performance thereof was evaluated in the same manner as Example 1.

The polishing rate for silicon dioxide was found to be 980 Å/min for a polishing time of 10 seconds and 1610 Å/min for a polishing time of 60 seconds, and therefore the polishing rate for 10 seconds was 61% of that for 60 seconds. The polishing rate for silicon nitride was 240 Å/min for a polishing time of 10 seconds and 410 Å/min for a polishing time of 60 seconds, and therefore the polishing rate for 10 seconds was 59% of that for 60 seconds. The polishing rate for both silicon dioxide films and silicon nitride films was at a low level, and the polishing rate was also strongly time-dependent. Also, the "selectivity ratio" for 60 seconds was a low value of 3.9. No imperfections were detected from the polished side.

Comparative Example 2

The high-purity cerium oxide slurry "GPL-C1010" was diluted 10-fold with purified water to produce a slurry at pH 7.0 with a concentration of 1 wt % cerium oxide which was not surface treated with a silane coupling agent, and the polishing performance thereof was evaluated in the same manner as Example 1.

The polishing rate for silicon dioxide was found to be 4150 Å/min for a polishing time of 10 seconds and 6100 Å/min for a polishing time of 60 seconds, and therefore the polishing rate for 10 seconds was 68% of that for 60 seconds. The polishing rate for silicon nitride was 680 Å/min for a polishing time of 10 seconds and 1050 Å/min for a polishing time of 60 seconds, and therefore the polishing rate for 10 seconds was 65% of that for 60 seconds. It was therefore demonstrated that the polishing rate for both silicon dioxide films and silicon nitride films was at a lower level than when surface treatment was carried out with a silane coupling agent, the polishing rate being particularly low during the initial polishing, showing strong time dependence of the polishing rate. Also, the "selectivity ratio" for 60 seconds was a low value of 5.8. Absolutely no imperfections were detected from the polished side.

Comparative Example 3

Fumed silica slurry (SC-1, 30 wt %) by Cabot Co. was diluted with purified water to produce a 10 wt % slurry, and surface treatment by the same method as Example 1 yielded 100 g of silane coupling agent-surface treated silica fine powder.

The 100 g of silica fine powder thus obtained was dispersed in purified water using a media agitation mill, KOH was then added to produce 1000 g of a silica slurry with a silica concentration of 10 wt % and a pH of 10.3, and the polishing performance thereof was evaluated in the same manner as Example 1.

The polishing rate for silicon dioxide was found to be 1050 Å/min for a polishing time of 10 seconds and 1570

Å/min for a polishing time of 60 seconds, and therefore the polishing rate for 10 seconds was 67% of that for 60 seconds. The polishing rate for silicon nitride was 240 Å/min for a polishing time of 10 seconds and 420 Å/min for a polishing time of 60 seconds, and therefore the polishing rate for 10 seconds was 57% of that for 60 seconds. The polishing rate for both silicon dioxide films and silicon nitride films was a low level, and the polishing rate was strongly time-dependent. Also, the "selectivity rati" for 60 seconds was a low value of 3.7. These results were virtually the same as in the case with no surface treatment with a silane coupling agent. The polished surface was found to have 600 imperfections per wafer.

Comparative Example 4

A manganese dioxide reagent ($MnO_2$ by Wako Pure Chemical Industries, Ltd., purity=99.5%) was pulverized and subjected to precipitation sorting using purified water to produce a 10 wt % manganese dioxide slurry adjusted to $d_{60}=0.7$ μm, and the polishing performance thereof was evaluated in the same manner as Example 1.

The polishing rate for silicon dioxide was found to be 1340 Å/min for a polishing time of 10 seconds and 2170 Å/min for a polishing time of 60 seconds, and therefore the polishing rate for 10 seconds was 62% of that for 60 seconds. The polishing rate for silicon nitride was 440 Å/min for a polishing time of 10 seconds and 750 Å/min for a polishing time of 60 seconds, and therefore the polishing rate for 10 seconds was 59% of that for 60 seconds. The polishing rate for both silicon dioxide films and silicon nitride films was a low level, and the polishing rate was strongly time-dependent. Also, the "selectivity ratio" for 60 seconds was a low value of 2.9. The polished surface was found to have 400 imperfections per wafer.

Comparative Example 5

The manganese dioxide slurry obtained in Comparative Example 4 was used to produce a slurry suspended manganese dioxide surface-treated with a silane coupling agent (manganese dioxide concentration: 10 wt %) by the same method as Example 1, and the polishing performance thereof was evaluated in the same manner as Example 1.

The polishing rate for silicon dioxide was found to be 1480 Å/min for a polishing time of 10 seconds and 2310 Å/min for a polishing time of 60 seconds, and therefore the polishing rate for 10 seconds was 64% of that for 60 seconds. The polishing rate for silicon nitride was 490 Å/min for a polishing time of 10 seconds and 780 Å/min for a polishing time of 60 seconds, and therefore the polishing rate for 10 seconds was 63% of that for 60 seconds. The polishing rate for both silicon dioxide films and silicon nitride films was a low level, and the polishing rate was strongly time-dependent. Also, the "selectivity ratio" for 60 seconds was a low value of 3.0. These results were virtually the same as in the case with no surface treatment with a silane coupling agent. The polished surface was found to have 630 imperfections per wafer.

The evaluation of the polishing performance for Examples 1–2 and Comparative Examples 1–5 is summarized in Table 1.

TABLE 1

| Sample | Silicon oxide film polishing rate (Å/min) | | Silicon nitride film polishing rate (Å/min) | | Stability of silicon oxide film polishing rate* | Selectivity ratio for 60 seconds of polishing** |
| --- | --- | --- | --- | --- | --- | --- |
| | 10 secs of polishing | 60 secs of polishing | 10 secs of polishing | 60 secs of polishing | | |
| Example 1 | 8700 | 8350 | 1400 | 1350 | 104 | 6.2 |
| Example 2 | 7400 | 7200 | 135 | 130 | 103 | 55.4 |
| Comp. Ex. 1 | 980 | 1610 | 240 | 410 | 61 | 3.9 |
| Comp. Ex. 2 | 4150 | 6100 | 680 | 1050 | 68 | 5.8 |
| Comp. Ex. 3 | 1050 | 1570 | 240 | 420 | 67 | 3.7 |
| Comp. Ex. 4 | 1340 | 2170 | 440 | 750 | 62 | 3.0 |
| Comp. Ex. 5 | 1480 | 2310 | 490 | 780 | 64 | 3.0 |

*(polishing rate (10 secs) for silicon oxide film)/(polishing rate (60 secs) for silicon oxide film) × 100 (%)
**(polishing rate (60 secs) for silicon oxide film)/(polishing rate (60 secs) for silicon nitride film)

Example 3

The step-reducing performance on the silicon dioxide film by the cerium oxide slurry obtained in Example 1 was evaluated by the following method.

[Polishing Conditions]

Polishing Target
  CVD silicon dioxide film with a model pattern for evaluation of step-reducing performance on a 6" φ, 625-μm thick silicon wafer (approximately 1.55 μm film thickness at raised sections, approximately 1 μm film thickness at depressed sections, step: approximately 0.55 μm, pattern size: 0.6 μm–4000 μm)

Pad
  Two-layer type LSI device polishing pad (IC1000/Suba400 by Rodel, Inc.)

Polishing Machine
  Single-side polishing machine for LSI device polishing (Model SH-24 by SpeedFam, Co., Ltd., table diameter: 610 mm)

Table Rotation Speed
  70 rpm

Working Pressure
  300 $gf/cm^2$

Slurry-supplied Rate
  100 ml/min

Polishing Time
  60 sec

[Evaluated Parameters and Evaluation Method]
Measured Pattern Size
0.6 μm, 100 μm, 4000 μm
Step Measurement
Stylus-type surface shape measuring apparatus (Step of target pattern measured after polishing)
The results are shown in Table 2.

Comparative Example 6

The step-reducing performance on silicon dioxide film by the silica slurry obtained in Comparative Example 1 was evaluated by the same method as Example 3.
The results are shown in Table 2.

Comparative Example 7

The step-reducing performance on silicon dioxide film by the cerium oxide slurry obtained in Comparative Example 2 was evaluated by the same method as Example 3.
The results are shown pin Table 2.

TABLE 2

| No. | Composition | Step after polishing (Å) | | |
|---|---|---|---|---|
| | | 0.6 μm | 100 μm | 4000 μm |
| Example 3 | 1.0 wt % cerium oxide treated with silane coupling agent | 200 | 300 | 1400 |
| Comp. Ex. 6 | 10 wt % silica | 2600 | 2800 | 4400 |
| Comp. Ex. 7 | 1.0 wt % cerium oxide | 1700 | 2100 | 3700 |

Example 4

Coupling agent-treated cerium oxide fine powder was produced by the same method as Example 1 and suspended in different water-soluble organic solutions adjusted to appropriate pH values, to obtain the polishing-material compositions listed in Table 3. Their polishing performance was evaluated in the same manner as Example 1. The results are summarized in Table 4.

TABLE 3

| No. | Polishing composition | pH |
|---|---|---|
| 1 | 1 wt % silane coupling agent-treated cerium oxide, 1 wt % lactic acid, adjusted to pH 7 with ammonia water | 7.0 |
| 2 | 1 wt % silane coupling agent-treated cerium oxide, 2 wt % lactic acid, adjusted to pH 7 with ammonia water | 7.0 |
| 3 | 1 wt % silane coupling agent-treated cerium oxide, 3 wt % lactic acid, adjusted to pH 7 with ammonia water | 7.0 |
| 4 | 1 wt % silane coupling agent-treated cerium oxide, 2 wt % malic acid, adjusted to pH 7 with ammonia water | 7.0 |
| 5 | 1 wt % silane coupling agent-treated cerium oxide, 2 wt % tartaric acid, adjusted to pH 7 with ammonia water | 7.0 |
| 6 | 1 wt % silane coupling agent-treated cerium oxide, 2 wt % succinic acid, adjusted to pH 7 with ammonia water | 7.0 |
| 7 | 1 wt % silane coupling agent-treated cerium oxide, 0.5 wt % gluconic acid, adjusted to pH 7 with ammonia water | 7.0 |
| 8 | 1 wt % silane coupling agent-treated cerium oxide, 200 ppm aspartic acid | 3.8 |
| 9 | 1 wt % silane coupling agent-treated cerium oxide, 500 ppm glutamic acid | 4.0 |
| 10 | 1 wt % silane coupling agent-treated cerium oxide, 1 wt % 6-aminohexanoic acid | 6.5 |
| 11 | 1 wt % silane coupling agent-treated cerium oxide, 1 wt % 2,7-naphthalenedisulfonic acid, adjusted to pH 7 with ammonia water | 7.0 |
| 12 | 1 wt % silane coupling agent-treated cerium oxide, 1 wt % 2-aminoethanesulfonic acid, adjusted to pH 7 with ammonia water | 7.0 |
| 13 | 1 wt % silane coupling agent-treated cerium oxide, 3 wt % lactic aid, 1 wt% 6-aminohexanoic acid, adjusted to pH 7 with ammonia water | 7.0 |

TABLE 4

| | Silicon oxide film polishing rate (Å/min) | | Silicon nitride film polishing rate (Å/min) | | Stability of silicon oxide film polishing rate* | Selectivity ratio for 60 seconds of polishing** |
|---|---|---|---|---|---|---|
| No. | 10 secs of polishing | 60 secs of polishing | 10 secs of polishing | 60 secs of polishing | | |
| 1 | 5370 | 5150 | none | 48 | 104 | 107 |
| 2 | 4630 | 4470 | none | 36 | 104 | 124 |
| 3 | 3980 | 3830 | none | 24 | 104 | 160 |
| 4 | 3910 | 3920 | none | 32 | 100 | 123 |
| 5 | 3390 | 3210 | none | 28 | 106 | 115 |
| 6 | 3050 | 2980 | none | 49 | 102 | 61 |
| 7 | 2490 | 2420 | none | 17 | 103 | 142 |
| 8 | 8010 | 7580 | none | 43 | 106 | 176 |
| 9 | 6360 | 6130 | none | 46 | 104 | 133 |
| 10 | 5600 | 5380 | none | 99 | 104 | 54 |
| 11 | 4130 | 3990 | none | 47 | 104 | 85 |
| 12 | 5010 | 4850 | none | 77 | 103 | 63 |
| 13 | 5330 | 5120 | none | 22 | 104 | 233 |

*(polishing rate (10 secs) for silicon oxide film)/(polishing rate (60 secs) for silicon oxide film) × 100 (%)
**(polishing rate (60 secs) for silicon oxide film)/(polishing rate (60 secs) for silicon nitride film)

INDUSTRIAL APPLICABILITY

Because the polishing-material composition of the invention contains cerium oxide had improved affinity for pads due to surface treatment with a coupling agent, it was therefore possible to realize a higher level of both surface accuracy and polishing rate, as well as stabilization of polishing rate in the polishing steps for insulating films including silicon dioxide films, silicon nitride films and organic films in manufacturing processes for LSI devices.

What is claimed is:

1. A polishing-material composition for polishing LSI devices comprising water and cerium oxide which has been surface-treated with a coupling agent, wherein the cerium oxide has a maximum size of about 5 µm and an average secondary particle size of from about 0.01 to about 1.0 µm.

2. A polishing-material composition for polishing LSI devices according to claim 1, wherein the cerium oxide has a primary crystal size of from about 0.005 to about 0.5 µm.

3. A polishing-material composition for polishing LSI devices according to claim 1, wherein the cerium oxide is present in the polishing-material composition in an amount of from about 0.01 to about 10 wt %.

4. A polishing-material composition for polishing LSI devices according to claim 1, wherein said coupling agent is at least one coupling agent selected from the group consisting of silane coupling agents, titanate coupling agents, zirconate coupling agents, aluminum coupling agents and phosphate coupling agents.

5. A polishing-material composition for polishing LSI devices according to claim 1, wherein the polishing-material composition has a pH of from about 2 to about 11.

6. A polishing-material composition for polishing LSI devices according to claim 1, wherein the polishing-material composition has a pH of from about 4 to about 11, and further wherein the polishing material composition exhibits a selectivity ratio of at least about 10 as determined by using the composition to polish independently and under identical conditions a polishing target, the polishing target being defined as either a silicon nitride film formed separately by CVD on a silicon substrate or a silicon dioxide film formed separately by CVD on a silicon substrate, the selectivity ratio being calculated by dividing a polishing rate for the silicon dioxide film by a polishing rate for the silicon nitride film, and the polishing rate being defined as amount of polishing target removed divided by polishing time.

7. A polishing-material composition for polishing LSI devices according to claim 1, wherein a polishing rate for 10 seconds of polishing a polishing target evenly formed on a silicon substrate is from 0.8 to 1.2 times a polishing rate for 60 seconds of polishing a polishing target evenly formed on a silicon substrate, the polishing rate being defined as amount of polishing target removed divided by polishing time, and the polishing target being defined as either a silicon nitride film formed separately by CVD on a silicon substrate or a silicon dioxide film formed separately by CVD on a silicon substrate.

8. A polishing-material composition for polishing LSI devices according to claim 1, further comprising at least one water soluble organic compound containing at least one group selected from the group consisting of —COOH groups, —COOM$_x$ groups (where M$_x$ is an atom or functional group that can be substituted for an H atom to form a salt), —SO$_3$H groups and —SO$_3$M$_y$ groups (where M$_y$ is an atom or functional group that can be substituted for an H atom to form a salt).

9. A polishing-material composition for polishing LSI devices according to claim 8, wherein the polishing material composition exhibits a selectivity ratio of at least about 50 as determined by using the composition to polish independently and under identical conditions a polishing target, the polishing target being defined as either a silicon nitride film formed separately by CVD on a silicon substrate or a silicon dioxide film formed separately by CVD on a silicon substrate, the selectivity ratio being calculated by dividing a polishing rate for the silicon dioxide film by a polishing rate for the silicon nitride film, and the polishing rate being defined as amount of polishing target removed divided by polishing time.

10. A polishing method for LSI devices, which comprises a step of polishing an LSI device using a polishing pad made of resin and a polishing-material composition comprising water and cerium oxide which has been surface-treated with a coupling agent, wherein the cerium oxide has a maximum size of about 5 µm and an average secondary particle size of from about 0.01 to about 1.0 µm.

11. A polishing method for LSI devices according to claim 10, wherein the cerium oxide has a primary crystal size of from about 0.005 to about 0.5 µm.

12. A polishing method for LSI devices according to claim 10, wherein the cerium oxide is present in the polishing-material composition in an amount of from about 0.01 to about 10 wt %.

13. A polishing method for LSI devices according to claim 10, wherein said coupling agent is at least one coupling agent selected from the group consisting of silane coupling agents, titanate coupling agents, zirconate coupling agents, aluminum coupling agents and phosphate coupling agents.

14. A polishing method for LSI devices according to claim 10, wherein the polishing-material composition has a pH of from about 2 to about 11.

15. A polishing method for LSI devices according to claim 10, wherein the LSI device has a silicon nitride film formed by CVD on a silicon substrate and a silicon dioxide film formed thereon by CVD, and the method comprises a step of polishing said silicon dioxide film using said polishing-material composition, the pH of said composition being from about 4 to about 11, and using said silicon nitride as a stopper, further wherein the ratio of a polishing rate for the silicon dioxide film to a polishing rate for the silicon nitride film is about 10 or greater, the polishing rate being defined as amount of either silicon dioxide or silicon nitride removed divided by polishing time.

16. A polishing method for LSI devices according to claim 10, wherein a polishing rate for 10 seconds of polishing a polishing target evenly formed on a silicon substrate is from 0.8 to 1.2 times a polishing rate for 60 seconds of polishing a polishing target evenly formed on a silicon substrate, the polishing rate being defined as amount of polishing target removed divided by polishing time, and the polishing target being defined as either a silicon nitride film formed separately by CVD on a silicon substrate or a silicon dioxide film formed separately by CVD on a silicon substrate.

17. A polishing method for LSI devices according to claim 10, further comprising at least one water soluble organic compound containing at least one group selected from the group consisting of —COOH groups, —COOM$_x$ groups (where $M_x$ is an atom or functional group that can be substituted for an H atom to form a salt), —$SO_3H$ groups and —$SO_3M_y$ groups (where $M_y$ is an atom or functional group that can be substituted for an H atom to form a salt).

18. A polishing method for LSI devices according to claim 17, wherein the LSI device has a silicon nitride film formed by CVD on a silicon substrate and a silicon dioxide film formed thereon by CVD, and the method comprises a step of polishing said silicon dioxide film with said polishing-material composition and using said silicon nitride as a stopper, further wherein the ratio of a polishing rate for the silicon dioxide film to a polishing rate for the silicon nitride film is 50 or greater, the polishing rate being defined as amount of either silicon dioxide or silicon nitride removed divided by polishing time.

* * * * *

UNITED STATES PATENT AND TRADEMARK OFFICE
CERTIFICATE OF CORRECTION

PATENT NO. : 6,299,659 B1
DATED : October 9, 2001
INVENTOR(S) : Takanori Kido, Fumio Tsujino, Kagetaka Ichikawa and Nobuo Uotani It is certified that error appears in the above-identified patent and that said Letters Patent is hereby corrected as shown below:

Title page,
Item [63], Related U.S. Application Data, please delete "Continuation of application No. PCT/JP99/04241, filed on Aug. 5, 1999." and replace it with -- Continuation-in-Part of application No. PCT/JP99/04241, filed on Aug. 5, 1999. --

Column 1,
Line 7, please replace "a continuation of PCT/", and replace it with -- a continuation-in-part of PCT/ --.

Signed and Sealed this

Twenty-third Day of April, 2002

Attest:

*Attesting Officer*

JAMES E. ROGAN
*Director of the United States Patent and Trademark Office*